US010417156B2

(12) United States Patent
Hsu et al.

(10) Patent No.: US 10,417,156 B2
(45) Date of Patent: Sep. 17, 2019

(54) HARDWARE RESOURCE SHARING WITHIN PERIPHERAL COMPONENT INTERCONNECT EXPRESS (PCIE) ENVIRONMENT CAPABLE OF ASSIGNING HARDWARE RESOURCE DYNAMICALLY

(71) Applicants: Inventec (Pudong) Technology Corp., Shanghai (CN); Inventec Corporation, Taipei (TW)

(72) Inventors: Chao-Hsien Hsu, Taipei (TW); Tsung-Hsi Lee, Taipei (TW); Kuo-Wei Huang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 236 days.

(21) Appl. No.: 15/488,520

(22) Filed: Apr. 17, 2017

(65) Prior Publication Data

US 2018/0143929 A1 May 24, 2018

(30) Foreign Application Priority Data

Nov. 21, 2016 (CN) .......................... 2016 1 1047862

(51) Int. Cl.
G06F 13/00 (2006.01)
G06F 13/40 (2006.01)
G06F 13/42 (2006.01)
(52) U.S. Cl.
CPC ...... *G06F 13/4022* (2013.01); *G06F 13/4282* (2013.01)

(58) Field of Classification Search
CPC .................. G06F 13/4282; G06F 13/4022
See application file for complete search history.

(56) References Cited

U.S. PATENT DOCUMENTS

| 9,632,963 | B2 * | 4/2017 | Yi ....................... G06F 13/4022 |
| 9,858,228 | B2 * | 1/2018 | Lasater ............... G06F 13/4022 |
| 2008/0239945 | A1 * | 10/2008 | Gregg ................. G06F 11/2005 370/217 |
| 2009/0063894 | A1 * | 3/2009 | Billau ................. G06F 11/2005 714/5.11 |

* cited by examiner

*Primary Examiner* — Tammara R Peyton
(74) *Attorney, Agent, or Firm* — Winston Hsu

(57) ABSTRACT

A switching fabric includes a plurality of buses and a plurality of switching devices. A method for operating the switching fabric includes assigning the plurality of buses to be a plurality of peripheral buses and a plurality of computer buses according to a predetermined configuration, establishing electrical connections between the plurality of computer buses and the plurality of peripheral buses according to the predetermined configuration, and when a first computer is coupled to a first computer bus of the plurality of computer buses and performs a peripheral component interconnect express scan function, transmitting types and/or utilization information of a plurality of first peripheral devices corresponding to the first computer bus to the first computer according to the predetermined configuration to make the first computer reserve memory segments required by the plurality of first peripheral devices.

10 Claims, 3 Drawing Sheets

HARDWARE RESOURCE SHARING WITHIN PERIPHERAL COMPONENT INTERCONNECT EXPRESS (PCIE) ENVIRONMENT CAPABLE OF ASSIGNING HARDWARE RESOURCE DYNAMICALLY

BACKGROUND OF THE INVENTION

1. Field of the Invention

This invention relates to a hardware resource sharing system, especially relates to a hardware resource sharing system that is capable of assigning hardware resource dynamically.

2. Description of the Prior Art

As information technology advances, more and more applications are relying on the computing power of the computers. Therefore, a computing unit in a computer system, such as a common server system, may not be able to support all kinds of requirements and may need other hardware resources, such as a network interface controller (NIC), general purpose graphic processing unit (GPU), non-volatile memory express solid state drive (NVMe SSD), and fiber channel host bus adapter (HBA).

Since the hardware resources required by different applications are different, the servers applied to different applications may require different types or number of hardware resources. However in this case, once the server is equipped with the hardware resources for a specific application, it would be difficult to expand or update the hardware resources equipped on the server for a new application, and the users have to get a new server to replace the old one for the new application.

To solve this issue, the prior art starts to adopt external hardware resources, that is, the server may be connected to the hardware resources through interconnection buses. However, in prior art, once the computer system starts to operate, the hardware resources can only be accessed by the predetermined computer of the computer system. Therefore, if the hardware resources are hot plugged during the operation of the computer system, then the computer system may be suspended and fail to function normally. Therefore, the improvement brought by the external hardware resources is still very limited.

SUMMARY OF THE INVENTION

One embodiment of the present invention discloses a hardware resource sharing system. The hardware resource sharing system includes a switching fabric, and a resource sharing controller. The switching fabric includes a plurality of buses and a plurality of switching devices, and the plurality of buses are compatible with a peripheral component interconnect express (PCIE) transmission format. The resource sharing controller is coupled to the switching fabric. The resource sharing controller controls the switching fabric to assign the plurality of buses to be a plurality of peripheral buses and a plurality of computer buses according to a predetermined configuration, and establishes electrical connections between the plurality of computer buses and the plurality of peripheral buses according to the predetermined configuration.

The predetermined configuration includes number, types and/or utilization information of peripheral devices supportable by the hardware resource sharing system, the number of computers supportable by the hardware resource sharing system, and connection configuration between the plurality of buses and the plurality of switching devices. The plurality of computer buses are to be coupled to external computers, and the plurality of peripheral buses are to be coupled to peripheral devices. When a first computer is coupled to a first computer bus of the plurality of computer buses and performs a peripheral component interconnect express scan function, the resource sharing controller transmits types and/or utilization information of a plurality of first peripheral devices corresponding to the first computer bus to the first computer according to the predetermined configuration to make the first computer reserve memory segments required by the plurality of first peripheral devices.

One embodiment of the present invention discloses a method for operating a switching fabric. The switching fabric includes a plurality of buses and a plurality of switching devices. The method includes assigning the plurality of buses to be a plurality of peripheral buses and a plurality of computer buses according to a predetermined configuration, establishing electrical connections between the plurality of computer buses and the plurality of peripheral buses according to the predetermined configuration, and when a first computer is coupled to a first computer bus of the plurality of computer buses and performs a peripheral component interconnect express scan function, transmitting types and/or utilization information of a plurality of first peripheral devices corresponding to the first computer bus to the first computer according to the predetermined configuration to make the first computer reserve memory segments required by the plurality of first peripheral devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
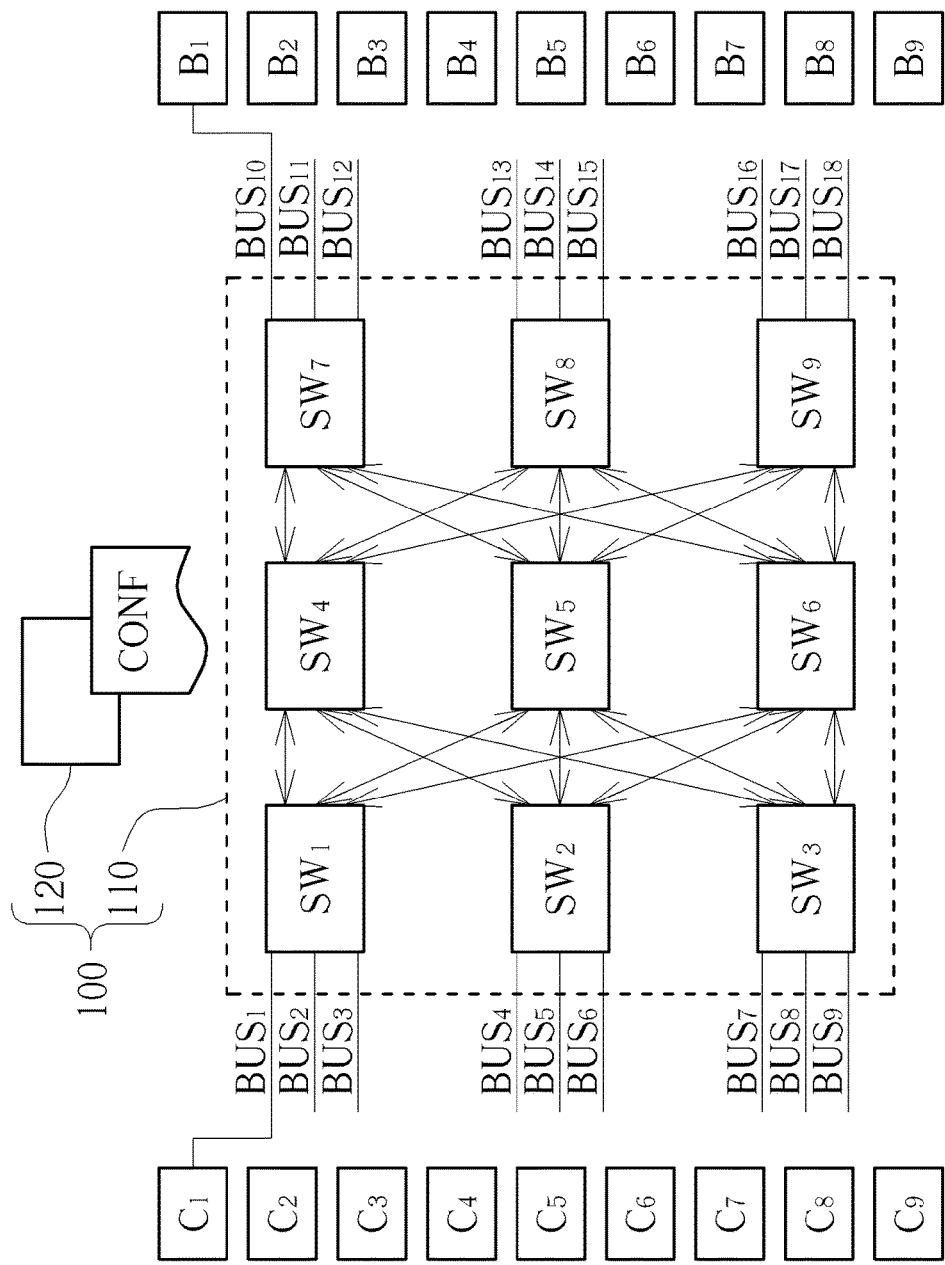
FIG. 1 shows a hardware resource sharing system according to one embodiment of the present invention.

FIG. 1 shows a hardware resource sharing system 100 according to one embodiment of the present invention. The hardware resource sharing system 100 includes a switching fabric 110 and a resource sharing controller 120. The resource sharing controller is coupled to the switching fabric 110.

In FIG. 1, the switching fabric 110 includes buses $BUS_1$ to $BUS_{18}$ and switching devices $SW_1$ to $SW_9$. The buses $BUS_1$ to $BUS_{18}$ are compatible with a peripheral component interconnect express (PCIE) transmission format. Each of the switching devices $SW_1$ to $SW_9$ has six input/output ports. The resource sharing controller 120 can control the inner-connections between the input/output ports of the switching devices $SW_1$ to $SW_9$.

In FIG. 1, the switching device $SW_1$ can be coupled to the buses $BUS_1$ to $BUS_3$, the switching device $SW_2$ can be coupled to the buses $BUS_4$ to $BUS_6$, and the switching device $SW_3$ can be coupled to the buses $BUS_7$ to $BUS_9$. Also, each of the switching devices $SW_1$ to $SW_3$ can be coupled to the switching devices $SW_4$ to $SW_6$, and each of the switching devices $SW_4$ to $SW_6$ can be coupled to the switching devices $SW_7$ to $SW_9$. The switching device $SW_7$ can be coupled to the buses $BUS_{10}$ to $BUS_{12}$, the switching device $SW_8$ can be coupled to the buses $BUS_{13}$ to $BUS_{15}$, and the switching device $SW_9$ can be coupled to the buses $BUS_{16}$ to $BUS_{18}$. Consequently, with the control of the resource sharing controller 120, the electrical connections between the buses $BUS_1$ to $BUS_{18}$ can be established flexibly.

To allow the host computer coupled to the hardware resource sharing system 100 to use the peripheral devices coupled to the hardware resource sharing system 100 flexibly, the user may set up a predetermined configuration CONF of the hardware resource sharing system 100 according to the system requirement. And the resource sharing controller 120 will control the switching fabric 110 according to the predetermined configuration CONF. The predetermined configuration CONF includes the number, types and/or utilization information of peripheral devices supportable by the hardware resource sharing system 100, the number of computers supportable by the hardware resource sharing system 100, and connection configuration between the buses $BUS_1$ to $BUS_{18}$ and the switching devices $SW_1$ to $SW_9$.

The resource sharing controller 120 can control the switching fabric 110 to assign the buses $BUS_1$ to $BUS_{18}$ to be a plurality of peripheral buses and a plurality of computer buses according to the number of supportable peripheral devices and the number of supportable computers described in the predetermined configuration CONF. For example, in FIG. 1, the resource sharing controller 120 can assign the buses $BUS_1$ to $BUS_9$ to be computer buses and assign the buses $BUS_{10}$ to $BUS_{18}$ to be peripheral buses. The computer buses $BUS_1$ to $BUS_9$ can be coupled to external host computers $C_1$ to $C_9$ while the peripheral buses $BUS_{10}$ to $BUS_{18}$ can be coupled to the external peripheral devices $B_1$ to $B_9$. Also, the resource sharing controller 120 can establish the electrical connections between the computer buses $BUS_1$ to $BUS_9$ and the peripheral buses $BUS_{10}$ to $BUS_{18}$, thereby coupling the external host computers $C_1$ to $C_9$ to the corresponding peripheral devices $B_1$ to $B_9$. The peripheral devices $B_1$ to $B_9$ can be network interface controllers (NIC), the general purpose graphic processing units (GPU), the nonvolatile memory express solid state drives (NVMe SSD), fiber channel host bus adapters (HBA) and/or other types of hardware resources.

In the aforementioned embodiments, each of the switching devices $SW_1$ to $SW_9$ has six input/output ports assigned as three input ports and three output ports, however, in some embodiments of the present invention, the switching fabric 110 can also be implemented with other types of switching devices, such as switching devices having configurable input/output ports, switching devices with other numbers of input/output ports, switching devices with other connection configuration, or switching devices of any two or more aforementioned switching devices. Namely, the user can choose suitable switching devices to implement the switching fabric 110 according to practical requirements, such as the number of host computers sharing the same hardware resources, and the number of peripheral devices for sharing.

In addition, the switching fabric 110 and the switching devices $SW_1$ to $SW_9$ shown in FIG. 1 are exemplary embodiments. In other embodiments of the present invention, the switching fabric 110 may include other numbers of switching devices and the connections between switching devices may also be adjusted according to the requirements.

To allow the computers coupled to the hardware resource sharing system 100 to use the peripheral devices reserved by the hardware resource sharing system 100 flexibly, when a computer is coupled to the hardware resource sharing system 100 and performs a peripheral component interconnect express scan function, the resource sharing controller 120 will transmit the types and/or the utilization information of the peripheral devices in place of the peripheral devices, making the computer reserve memory segments required by the peripheral devices.

For example in FIG. 1, when the computer $C_1$ is coupled to the computer bus $BUS_1$ and performs the peripheral component interconnect express scan function, the resource sharing controller 120 can transmit the types and/or the utilization information of the plurality of peripheral devices corresponding to the computer bus $BUS_1$ to the computer $C_1$ according to the predetermined configuration CONF. For example, if the computer bus $BUS_1$ is corresponding to all the peripheral buses $BUS_{10}$ to $BUS_{18}$, then the resource sharing controller 120 would transmit the types and/or the utilization information of the peripheral devices $B_1$ to $B_9$ that are corresponding to the peripheral buses $BUS_{10}$ to $BUS_{18}$ to the computer $C_1$. Consequently, the computer $C_1$ will be informed of which peripheral devices being available, and the computer $C_1$ can reserve the memory segments required by the peripheral devices $B_1$ to $B_9$ according to the information transmitted from the resource sharing controller 120.

However at this moment, the peripheral devices $B_1$ to $B_9$ may not be coupled to the peripheral buses $BUS_{10}$ to $BUS_{18}$ yet. When the computer $C_1$ sends a request to use a specific peripheral device, for example the peripheral device $B_1$, while the peripheral device $B_1$ is not coupled to the corresponding peripheral bus $BUS_{10}$ yet, the resource sharing controller 120 can transmit a busy message to the computer $C_1$ so that the computer $C_1$ will not be able to use the peripheral device $B_1$ temporarily.

Afterward, when the peripheral device $B_1$ is hot plugged to the corresponding peripheral bus $BUS_{10}$, the resource sharing controller 120 can control the switching fabric 110 to establish the electrical connection between the computer bus $BUS_1$ and the peripheral bus $BUS_{10}$. Consequently, the computer $C_1$ can exchange information with the peripheral device $B_{10}$ through the switching fabric 110, and can control the peripheral device $B_1$ normally.

Since the computer $C_1$ has reserved the memory segment required by the peripheral device $B_1$, the peripheral device $B_1$ can be coupled to the corresponding peripheral bus $BUS_{10}$ in a hot-plug manner, that is, the peripheral device $B_1$ does not have to be coupled to the corresponding peripheral bus $BUS_{10}$ before the computer $C_1$ is turned on. Consequently, the user can decide if additional peripheral devices should be added according to the rate of capacity utilization of the system.

For example, although the hardware resource sharing system 100 can reserve 16 general purpose graphic process units for the computer $C_1$ at first, the user does not have to prepare the 16 general purpose graphic process units at once. Instead, the user can set up 4 general purpose graphic process units first, and decide whether to set up additional general purpose graphic process units by observing the capacity utilization rate. Since the cost of the general purpose graphic process unit is quite high, the flexibility brought by the hardware resource sharing system 100 can not only increase the hardware utilization greatly, but also save the cost significantly.

Figure 2:
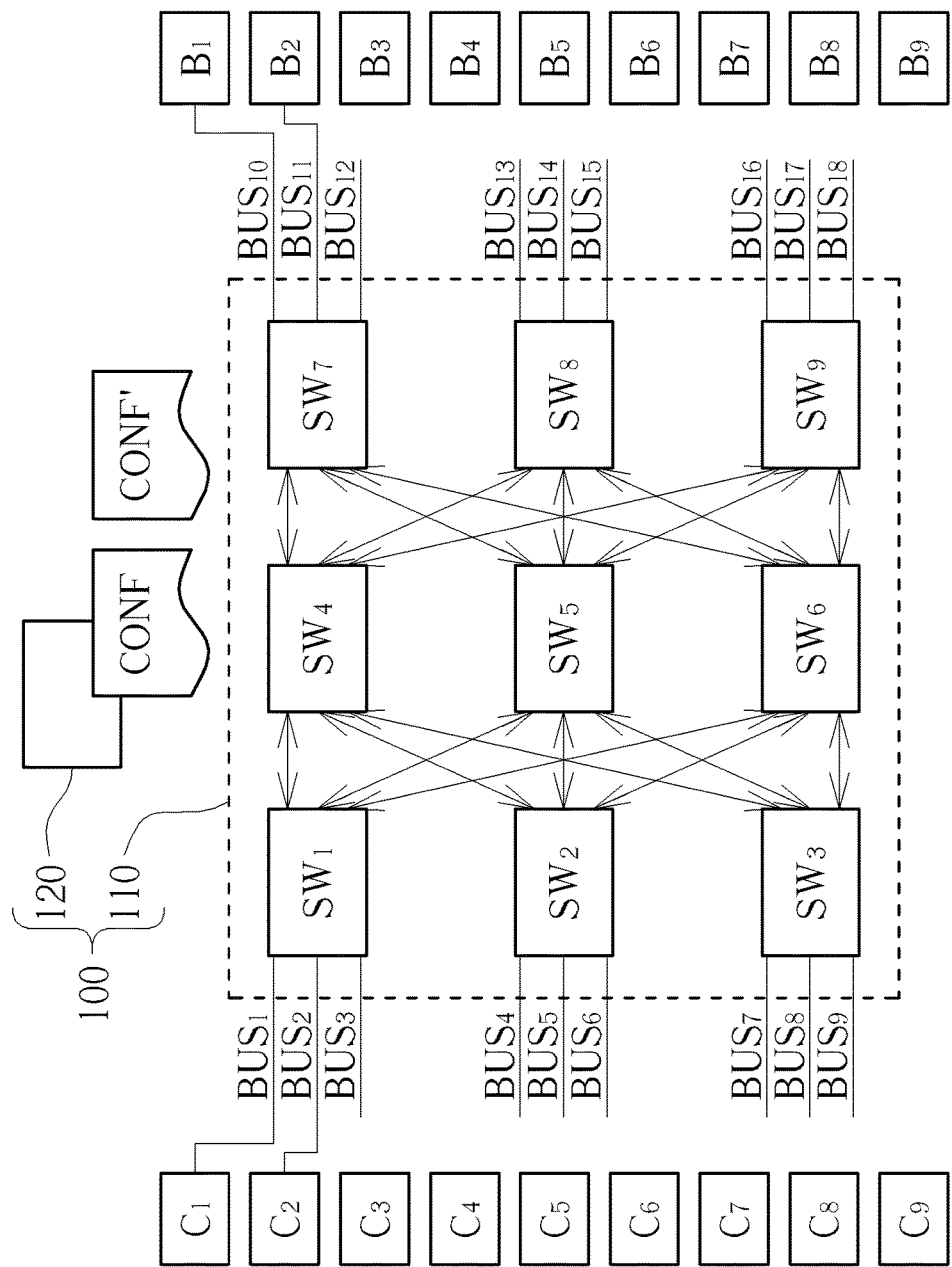
FIG. 2 shows a capacity utilization of the hardware sharing system in FIG. 1.

FIG. 2 shows a capacity utilization of the hardware sharing system 100. In FIG. 2, when the computer $C_2$ is coupled to the corresponding computer bus $BUS_2$ of the computer buses $BUS_1$ to $BUS_9$, the computer $C_2$ will perform the peripheral component interconnect express scan function to confirm the peripheral devices reserved for the computer $C_2$. In this case, the resource sharing controller 120 will transmit the types and/or the utilization information of the peripheral devices corresponding to peripheral buses corresponding to the computer bus $BUS_2$ to the computer $C_2$ according to the predetermined configuration CONF. In FIG. 2, the peripheral buses corresponding to the computer bus $BUS_2$ may be peripheral buses $BUS_{10}$ to $BUS_{11}$. Therefore, the resource sharing controller 120 will transmit the utilization information of the corresponding peripheral devices $B_1$ and $B_2$ to the computer $C_2$ so that the computer $C_2$ can reserve memory segments required by the peripheral devices $B_1$ and $B_2$ in advance.

Although the computers $C_1$ and $C_2$ are corresponding to the same peripheral device $B_1$, only one of the two computers will be able to use the peripheral device $B_1$ in the same time period, and the resource sharing controller 120 can decide which of the computers $C_1$ and $C_2$ can access the peripheral device $B_1$ in the time period. For example, if the computer $C_2$ tries to use the peripheral device $B_1$ while the computer $C_1$ occupies the peripheral $B_1$, the resource sharing controller 120 can issue a busy message to the computer $C_2$ so that the computer $C_2$ would not be able to access the peripheral device $B_2$ temporarily. Later, if the computer $C_1$ finishes using the peripheral device $B_1$ or the computer $C_1$ has released the peripheral device $B_1$ according to the notification of the resource sharing controller 120, then the computer $C_2$ will be able to use the peripheral device $B_1$ when the computer $C_2$ sends a request to access the peripheral device $B_1$ since no busy message will be sent to the computer $C_2$ by the resource sharing controller 120.

In some embodiments, since the resource sharing controller 120 may not have the exact information about which of the peripheral devices are needed by the computers, the connection between the computer and a specific peripheral device requested by the computer may not be established yet when the computer makes the request. Therefore, when the computer issues the handshaking message to the requested peripheral device, the resource sharing controller 120 can dynamically establish the connection between the computer and the requested peripheral device by controlling the switching fabric 110.

For example, in the present embodiment, when the computer $C_2$ requests to use the peripheral device $B_1$, the connection between the computer bus $BUS_2$ corresponding to the computer $C_2$ and the peripheral bus $BUS_{10}$ corresponding to the peripheral device $B_1$ may not be established yet. In this case, the resource sharing controller 120 can establish the connection between the computer bus $BUS_2$ and the peripheral bus $BUS_{10}$ according to the request. The connection between the computer bus $BUS_2$ and the peripheral bus $BUS_{10}$ can be established by, for example, controlling the switching devices $SW_1$, $SW_6$, and $SW_7$.

In some embodiments, the resource sharing controller 120 can get all the messages issued by the computers through the corresponding computer buses $BUS_1$ to $BUS_9$; therefore, the resource sharing controller 120 can configure the connections between the computer buses $BUS_1$ to $BUS_9$ and the peripheral buses $BUS_{10}$ to $BUS_{18}$ dynamically according to the utilization situation of each of the computers, thereby allowing the computers to use the peripheral devices hot plugged to the hardware resource sharing system 100.

The hardware resource sharing system 100 can configure the connections between the computer buses $BUS_1$ to $BUS_9$ and the peripheral buses $BUS_{10}$ to $BUS_{18}$ dynamically, and can reassign the numbers of computer buses and peripheral buses of the buses $BUS_1$ to $BUS_{18}$ according to requirements. By updating the required numbers of computer buses and peripheral buses in the predetermined configuration CONF, the user can have the resource sharing controller 120 reassign at least one of the peripheral buses $BUS_{10}$ to $BUS_{18}$ to be at least one computer bus or reassign at least one of the computer buses $BUS_1$ to $BUS_9$ to be at least one peripheral bus according to the updated configuration CONF'.

For example, when the user wants to increase the number of supportable computers in the hardware resource sharing system 100 and reduce the number of supportable peripheral devices, the user can update the predetermined configuration CONF according to his/her need. The resource sharing controller 120 can reassign some of the peripheral buses $BUS_{10}$ to $BUS_{18}$ to be computer buses according to the updated configuration CONF'. For example, the buses $BUS_{10}$ and $BUS_{12}$ may be reassigned as computer buses. Afterwards, the hardware resource sharing system 100 will get the messages issued by the computers through the buses $BUS_{10}$ and $BUS_{12}$, and will transmit the types and/or utilization information of the corresponding peripheral devices to the computers accordingly when the computers perform the peripheral component interconnect express scan function.

Contrarily, if the user wants to decrease the number of supportable computers in the hardware resource sharing system 100 and increase the number of supportable peripheral devices, then the resource sharing controller 120 can reassign some of the computer buses $BUS_1$ to $BUS_9$ to be peripheral buses according to the updated configuration CONF'. For example, the buses $BUS_7$ and $BUS_9$ may be reassigned as peripheral buses. Afterwards, the hardware resource sharing system 100 will not try to get the computer related information from the buses $BUS_7$ and $BUS_9$. In order to ensure that the resource sharing controller 120 can complete the assignment of the buses $BUS_1$ to $BUS_{18}$ according to the updated configuration CONF', the hardware resource sharing system 100 may have to be reset in some embodiments. Therefore, when reassigning the buses $BUS_1$ to $BUS_{18}$ according to the updated configuration CONF', the computers $C_1$ to $C_9$ may have to be disabled or off-line so as to avoid crashing the computers $C_1$ to $C_9$ due to the loss of connection to the corresponding peripheral devices.

With the hardware resource sharing system 100, different computers can share the same peripheral devices. Also, with the resource sharing controller 120, the connections between the computers and the peripheral devices can be adjusted dynamically, and the user can couple the peripheral devices to the hardware resource sharing system 100 in a hot plugging manner. Therefore, the flexibility of usage and the utilization rate of hardware resources can both be increased significantly.

Figure 3:
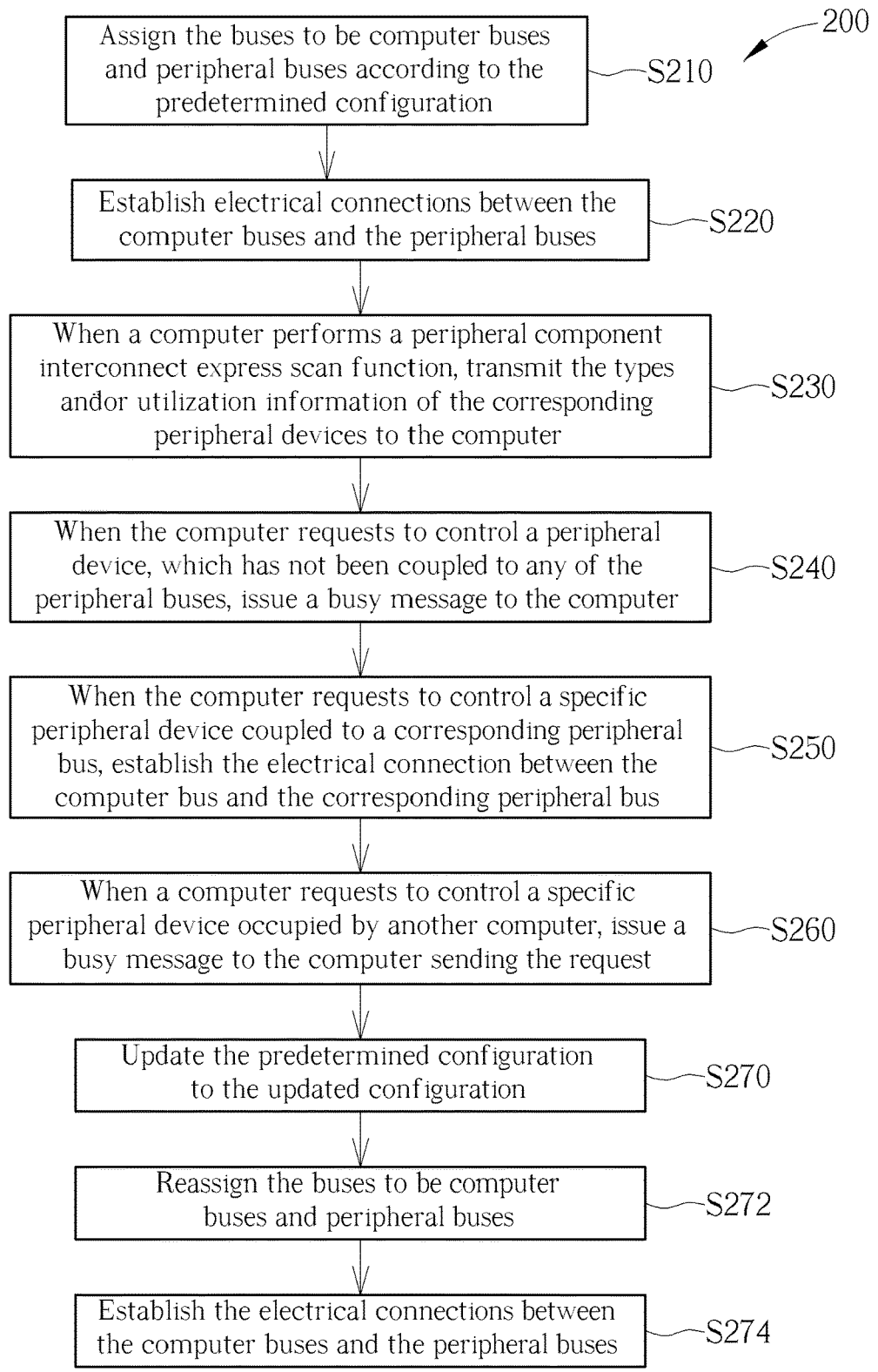
FIG. 3 shows a method for operating the switching fabric according to one embodiment of the present invention.

FIG. 3 shows a method 200 for operating the switching fabric 110 according to one embodiment of the present invention. The method 200 includes steps S210 to S274.

S210: assign the buses $BUS_1$ to $BUS_{18}$ to be computer buses $BUS_1$ to $BUS_9$ and peripheral buses $BUS_{10}$ to $BUS_{18}$ according to the predetermined configuration CONF;

S220: establish electrical connections between the computer buses $BUS_1$ to $BUS_9$ and the peripheral buses $BUS_{10}$ to $BUS_{18}$ according to the predetermined configuration CONF;

S230: when a computer is coupled to a computer bus and performs a peripheral component interconnect express scan function, transmit the types and/or utilization information of a plurality of peripheral devices corresponding to the computer bus to the computer according to the predetermined configuration CONF to make the computer reserve memory segments required by the plurality of first peripheral devices;

S240: when the computer sends a request to control a specific peripheral device while the specific peripheral device has not been coupled to any of the plurality of peripheral buses, issue a busy message to the computer;

S250: when the computer sends a request to control a specific peripheral device of the plurality of peripheral devices while the specific peripheral device has been coupled to a corresponding peripheral bus of the plurality of first peripheral buses, establish an electrical connection between the computer bus and the corresponding peripheral bus;

S260: when a computer sends a request to control a specific peripheral device occupied by another computer, issue a busy message to the computer sending the request;

S270: when a user tries to update the predetermined configuration CONF, update the predetermined configuration CONF to the updated configuration CONF';

S272: reassign the buses $BUS_1$ to $BUS_{18}$ to be a plurality of computer buses and a plurality of peripheral buses according to the updated configuration CONF'; and S274: establish the electrical connections between the computer buses and the peripheral buses according to the updated configuration CONE'.

In steps S210 and S220, the buses $BUS_1$ to $BUS_{18}$ are assigned to be computer buses $BUS_1$ to $BUS_9$ and peripheral buses $BUS_{10}$ to $BUS_{18}$ according to the predetermined configuration CONE, and the electrical connections between the computer buses and the peripheral buses are established.

In step S230, when the computer $C_1$ is coupled to the computer bus $BUS_1$ of the computer buses $BUS_1$ to $BUS_9$ and performs the peripheral component interconnect express scan function, the types and/or utilization information of the peripheral devices $B_1$ to $B_9$ corresponding to the computer bus $BUS_1$ is transmitted to the computer $C_1$ according to the predetermined configuration CONF so that the computer $C_1$ can reserve memory segments required by the peripheral devices $B_1$ to $B_9$.

In step S240, when the computer $C_1$ requests to control a specific peripheral device $B_1$ of the corresponding peripheral devices $B_1$ to $B_9$, and the peripheral device $B_1$ has not been coupled to the corresponding peripheral bus $BUS_{10}$, the busy message would be transmitted to the computer $C_1$.

Also, when the computer $C_1$ requests to control the peripheral device $B_1$ while the peripheral device $B_1$ has been coupled to the peripheral bus $BUS_{10}$, if the electronic connection between the computer bus $BUS_1$ and the peripheral bus $BUS_{10}$ has not been established yet, then the electrical connection between the computer bus $BUS_1$ and the peripheral bus $BUS_{10}$ will be established in step S250. However, if the electrical connection between the computer bus $BUS_1$ and the peripheral bus $BUS_{10}$ has been established previously, then no new electrical connection has to be established in step S250.

In some embodiments of the present invention, the method 200 can repeat steps S230, S240, S250, S260, and S270 to determine the connection situation between the computers and the peripheral devices coupled to the switching fabric 110 and execute the corresponding operations. In addition, the method 200 is not limited to the sequence shown in FIG. 3. In some embodiments, steps S230, S240, S250, S260, and S270 can be exchanged.

Consequently, when the computer $C_2$ is coupled to the computer bus $BUS_2$ and performs the peripheral component interconnect express scan function, the types and/or utilization information of the peripheral devices $B_{10}$ to $B_{11}$ corresponding to the computer bus $BUS_2$ would be transmitted to the computer $C_2$ according to the predetermined configuration CONF in step S230 so that the computer $C_2$ can reserve memory segments required by the peripheral devices $B_1$ and $B_2$.

Later, if the computer $C_2$ requests to control the peripheral device $B_1$ while the peripheral device $B_1$ is occupied by the computer $C_2$, the busy message will be transmitted to the computer $C_2$ in step S260.

In addition, when the user wants to update the predetermined configuration CONF, the predetermined configuration CONF can be updated to the updated configuration CONF" in step S270. Next, in step S272, the buses $BUS_1$ to $BUS_{18}$ will be reassigned to be a plurality of computer buses and a plurality of peripheral buses according to the updated configuration CONF'. For example, at least one of the peripheral buses $BUS_{10}$ to $BUS_{18}$ can be reassigned as computer bus, and/or at least one of the computer buses $BUS_1$ to $BUS_9$ can be reassigned as peripheral bus. Then, in step S274, the electrical connections between the computer buses and the peripheral buses can be established according to the updated configuration CONF'.

According to the method 200, different computers can share the same peripheral device through the switching fabric 110, and the connections between the computers and the peripheral devices can be adjusted dynamically. Therefore, the users are able to couple the peripheral devices to the switching fabric 110 in a hot plugging manner, thereby increasing the utilization rate of the hardware resource and the flexibility of usage.

In summary, the hardware resource sharing system and the method for operating the switch fabric provided by the embodiments of the present invention allow different computers to share the same peripheral device. Also, the connections between the computers and the peripheral devices can be adjusted dynamically. Therefore, the users are able to couple the peripheral devices to the switching fabric in a hot plugging manner, thereby increasing the utilization rate of the hardware resource and the flexibility of usage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hardware resource sharing system comprising:
   a switching fabric comprising a plurality of buses and a plurality of switching devices, the plurality of buses being compatible with a peripheral component interconnect express (PCIE) transmission format; and
   a resource sharing controller coupled to the switching fabric and configured to control the switching fabric to assign the plurality of buses to be a plurality of peripheral buses and a plurality of computer buses according to a predetermined configuration, and establish electrical connections between the plurality of computer buses and the plurality of peripheral buses according to the predetermined configuration;
   wherein:
   the predetermined configuration comprises number, types and/or utilization information of peripheral devices supportable by the hardware resource sharing system, number of computers supportable by the hardware resource sharing system, and connection configuration between the plurality of buses and the plurality of switching devices;

the plurality of computer buses are configured to be coupled to external computers;

the plurality of peripheral buses are configured to be coupled to peripheral devices; and when a first computer is coupled to a first computer bus of the plurality of computer buses and performs a peripheral component interconnect express scan function, the resource sharing controller transmits types and/or utilization information of a plurality of first peripheral devices corresponding to the first computer bus to the first computer according to the predetermined configuration to make the first computer reserve memory segments required by the plurality of first peripheral devices;

when the first computer sends a request to the resource sharing controller to control a specific peripheral device of the plurality of first peripheral devices while the specific peripheral device has not coupled to any of the plurality of peripheral buses, the resource sharing controller issues a busy message to the first computer.

2. The hardware resource sharing system of claim 1, wherein when the first computer sends a request to the resource sharing controller to control the specific peripheral device of the plurality of peripheral devices while the specific peripheral device is coupled to a corresponding peripheral bus of the plurality of first peripheral buses, the resource sharing controller controls the switching fabric to establish an electrical connection between the first computer bus and the corresponding peripheral bus.

3. The hardware resource sharing system of claim 1, wherein:

when a second computer is coupled to a second computer bus of the plurality of computer buses and performs the peripheral component interconnect express scan function, the resource sharing controller transmits types and/or utilization information of a plurality of second peripheral devices corresponding to the second computer bus to the second computer according to the predetermined configuration to make the second computer reserve memory segments required by the plurality of second peripheral devices; and at least one peripheral device corresponds to both of the first computer bus and the second computer bus.

4. The hardware resource sharing system of claim 3, wherein:

when the first computer occupies a specific peripheral device corresponding to both of the first computer bus and the second computer bus, and the second computer sends a request to the resource sharing controller to control the specific peripheral device, the resource sharing controller issues a busy message to the second computer.

5. The hardware resource sharing system of claim 1, wherein the resource sharing controller is further configured to reassign the plurality of buses to be a plurality of computer buses and a plurality of peripheral buses according to an updated configuration.

6. A method for operating a switching fabric, the switching fabric comprising a plurality of buses and a plurality of switching devices, the method comprising:

assigning the plurality of buses to be a plurality of peripheral buses and a plurality of computer buses according to a predetermined configuration;

establishing electrical connections between the plurality of computer buses and the plurality of peripheral buses according to the predetermined configuration;

when a first computer is coupled to a first computer bus of the plurality of computer buses and performs a peripheral component interconnect express scan function, transmitting types and/or utilization information of a plurality of first peripheral devices corresponding to the first computer bus to the first computer according to the predetermined configuration to make the first computer reserve memory segments required by the plurality of first peripheral devices; and when the first computer sends a request to control a specific peripheral device of the plurality of first peripheral devices while the specific peripheral device has not coupled to any of the plurality of peripheral buses, issuing a busy message to the first computer.

7. The method for operating the switching fabric of claim 6, further comprising:

when the first computer sends a request to control the specific peripheral device of the plurality of peripheral devices while the specific peripheral device is coupled to a corresponding peripheral bus of the plurality of first peripheral buses, establishing an electrical connection between the first computer bus and the corresponding peripheral bus.

8. The method for operating the switching fabric, of claim 6, further comprising:

when a second computer is coupled to a second computer bus of the plurality of computer buses and performs the peripheral component interconnect express scan function, transmitting types and/or utilization information of a plurality of second peripheral devices corresponding to the second computer bus to the second computer according to the predetermined configuration to make the second computer reserve memory segments required by the plurality of second peripheral devices;

wherein at least one peripheral device corresponds to both of the first computer bus and the second computer bus.

9. The method for operating the switching fabric, of claim 8, further comprising:

when the first computer occupies a specific peripheral device corresponding to both of the first computer bus and the second computer bus, and the second computer sends a request to control the specific peripheral device, issuing a busy message to the second computer.

10. The method for operating the switching fabric, of claim 6, further comprising:

updating the predetermined configuration to generate an updated configuration; and reassigning the plurality of buses to be a plurality of computer buses and a plurality of peripheral buses according to the updated configuration.

* * * * *